US00RE36662E

United States Patent [19]

Galison

[11] E Patent Number: Re. 36,662

[45] Reissued Date of Patent: Apr. 18, 2000

[54] DISPLAY OF CHANGING MOON ON WATCH FACE

[76] Inventor: William A. Galison, 210 Thompson St., New York, N.Y. 10012

[21] Appl. No.: 08/634,130

[22] Filed: Apr. 19, 1996

Related U.S. Patent Documents

Reissue of:

[64] Patent No.: 5,245,590
Issued: Sep. 14, 1993
Appl. No.: 07/911,418
Filed: Jul. 10, 1992

U.S. Applications:

[63] Continuation of application No. 08/241,451, May 9, 1994, abandoned.

[51] Int. Cl.[7] ..... G04B 19/26; G04C 17/00

[52] U.S. Cl. ..... 368/18; 368/223

[58] Field of Search ..... 368/15–20; 33/268–270; 968/414–416

[56] References Cited

U.S. PATENT DOCUMENTS

| | | | |
|---|---|---|---|
| 508,467 | 11/1893 | Clark | 368/18 |
| 4,711,583 | 12/1987 | Oelhslin | 368/16 |
| 4,759,002 | 7/1988 | Cash | 368/15 |
| 5,293,555 | 3/1994 | Widen et al. | 368/19 |

FOREIGN PATENT DOCUMENTS

| | | | |
|---|---|---|---|
| 2639753 | 11/1988 | France . | |
| 2-311789 | 12/1990 | Japan | 368/18 |

*Primary Examiner*—Vit Miska
*Attorney, Agent, or Firm*—Levisohn, Lerner, Berger & Langsam

[57] ABSTRACT

A timepiece having a circular face for displaying analog time of day and using the same face to display the phases of the moon.

15 Claims, 3 Drawing Sheets

DISPLAY OF CHANGING MOON ON WATCH FACE

Matter enclosed in heavy brackets [ ] appears in the original patent but forms no part of this reissue specification; matter printed in italics indicates the additions made by reissue.

*This Reissue application is a continuation of Reissue application Ser. No. 08/241,451 filed May 9, 1994, now abandoned, which is a Reissue application of U.S. Pat. No. 5,245,590, issued Sep. 14, 1993.*

BACKGROUND OF THE INVENTION

This invention relates to a new and novel watch face in which the changing moon is displayed on the face of the watch.

There currently exists watches in which separate display elements are carried on the face thereof displaying different phases of the moon. To the inventor's knowledge, there is no watch in which the changing moon is displayed as a change in shading of color across the face of the watch in accordance with the 28-day moon cycle.

An object of this invention is to provide an improved watch or clock face in which the changing moon phase is displayed on an analog basis across the face of the watch or clock face.

Another object of this invention is to provide a new and unique moon phase display which utilizes conventional and well-known watch components so as to minimize cost and additional expense.

Other objects, advantages and features of this invention will become more apparent from the following description.

SUMMARY OF THE INVENTION

In accordance with the principles of this invention, the above objects are accomplished by providing a digital processor as part of the new and novel watch in which a 28-day cycle is established. A 28-day cycle causes output signals to be applied to a display controller which slowly changes the display across the face of the watch as the state of the moon phases change. Specifically, and in accordance with a preferred embodiment of this invention, LCDs (i.e., Liquid Crystal Displays) with associated drivers are employed, and the watch face is divided into sections so that the watch face will display changing contrasting portions on its circular face in synchronism with the phases of the moon, with the circular face gradually changing from light to dark or dark to light across the face of the watch or clock as the phases of the moon change.

A BRIEF DESCRIPTION OF THE DRAWINGS

DETAILED DESCRIPTION

In accordance of the principles of this invention, a conventional digital microprocessor for a watch is employed, with such microprocessors widely employed for most digital and analog electronic watches. An additional 28-day cycle is programmed in the microprocessor using conventional timing signals generated as part of the regular operation of the microprocessor.

Figure 1:
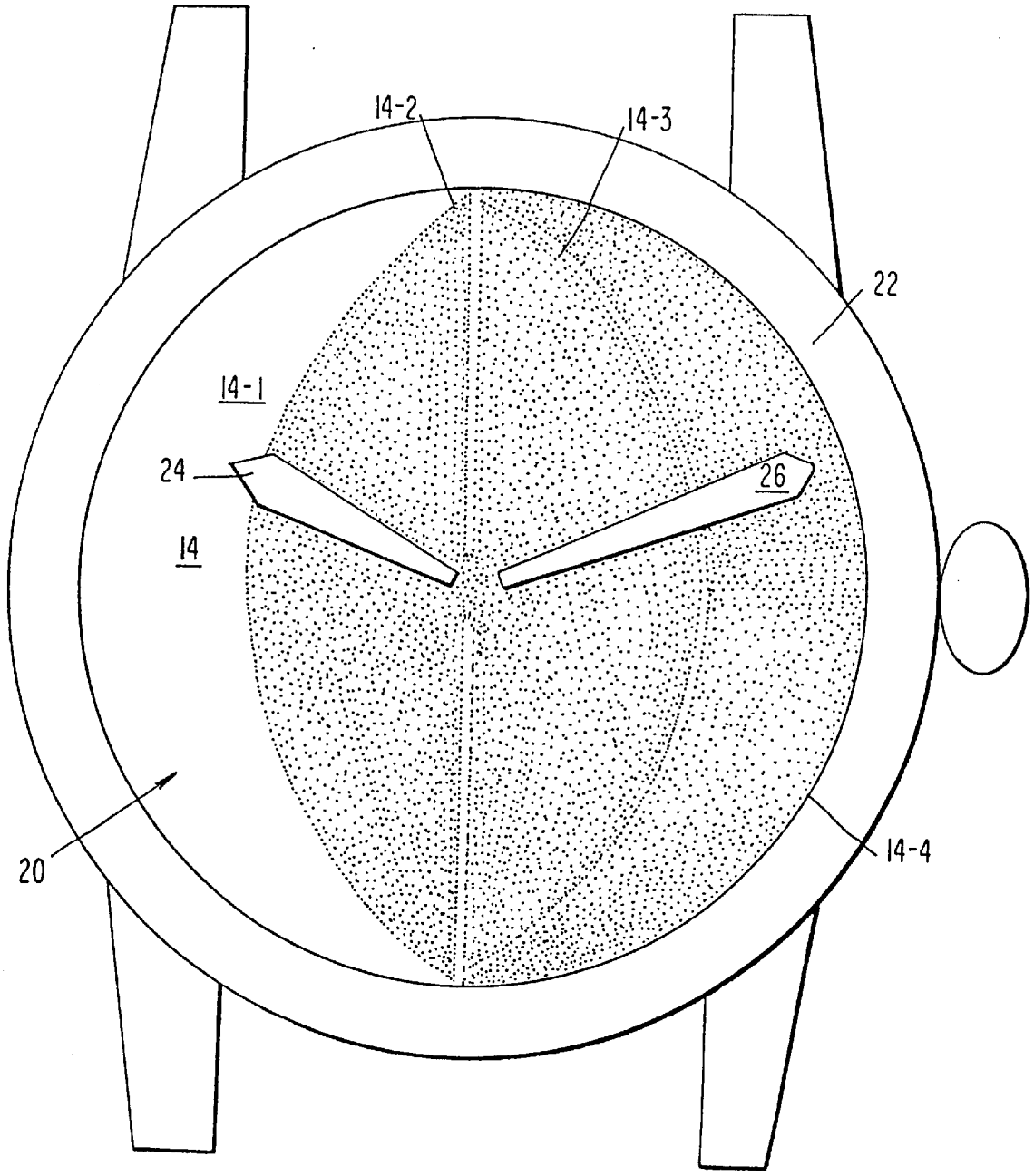
FIG. 1 is a plan view of a watch face showing one state of the display of the watch face.
Figure 2:
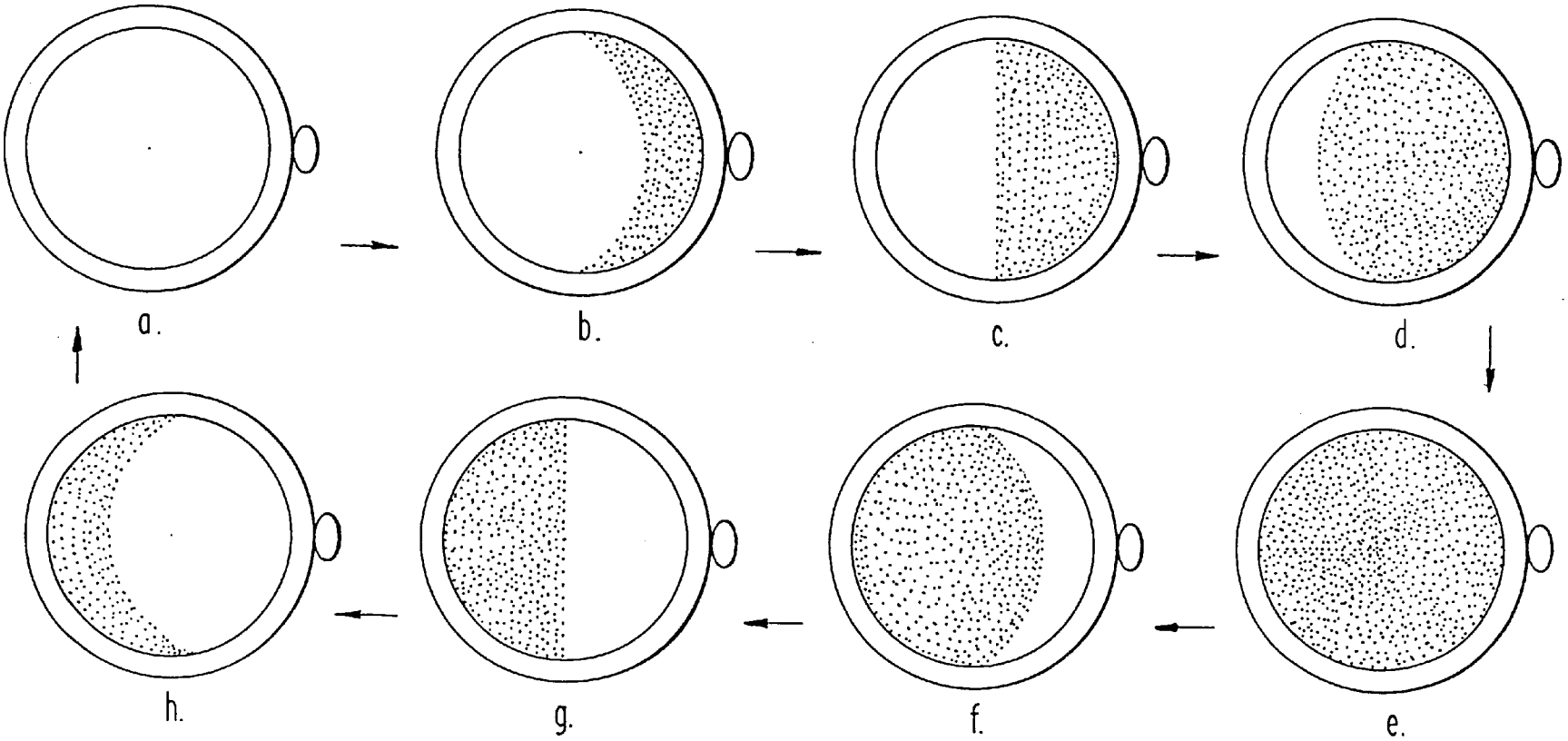
FIGS. 2a–2h are plan views of the watch face showing sequential discrete phases of the moon from full moon (light) to new moon (dark) to full moon (light).
Figure 3:
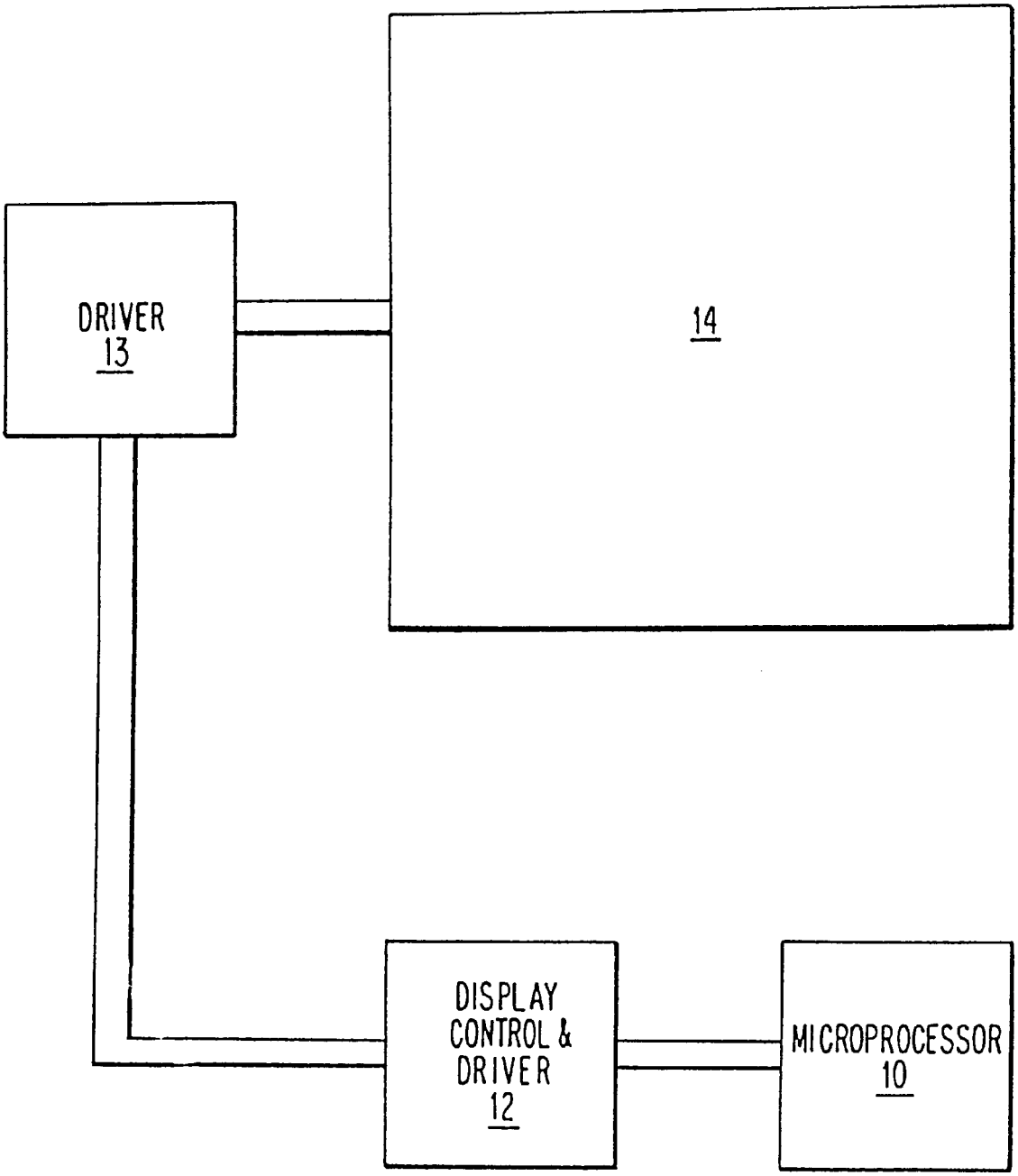
FIG. 3 is a block diagram showing the functional blocks of this invention.

The signals generated to display the day of the moon phase are generated by connecting microprocessor 10 (FIG. 3) to display control and driver 12 which is connected to driver 13 and to LCDs 14. The LCDs 14 are crescent shaped as are shown in FIG. 1, as 14-1, 14-2, 14-3 and 14-4 (FIG. 1). The selection of which and how many LCDs are energized is controlled by display control and driver 12. The number of LCDs driven and the power to control the drivers is dependent upon the size of the watch or clock, and the larger the watch or clock, the greater the power that will be employed. The crescent shaped LCDs are abut each other, and incremental shading is accomplished by activation of the series of abutting LCDs. A slight space or gap between abutting LCDs may remain and an additional LCD layer may be used to cover this space.

FIG. 1 illustrates a watch face 20 which is circular with the face formed of the LCDs identified above. A rim or border 22 surrounds the watch face 20. The time of day may be shown by conventional watch hands 24 and 26 that rotate in front of the watch face. Such watch hands are of a color or design rendering them visible against both light and dark backgrounds.

FIGS. 2a–2h shows the LCD watch face in a cycle of configurations beginning with the "full moon" face (a) and incrementally darkening to a "new moon" (Dark) face (e), then lightening in reverse direction back to the "full moon".

In these figures, the LCD watch face 20 is shown as having four discrete LCDs that can change color, creating a cycle with eight phases. As another embodiment, the LCD display may use 14 crescents shaped LCDs and there will be a 28 phase cycle which will cause the "moon" shape to change approximately once every 24 hours. A slight gap between adjacent LCDs will exist and such gap may be faintly visible. It is possible additional LCD layers may be used to cover such gap.

The conventional microchip used to drive the LCD display is known as an "LCD display segment driver chip" which can control different numbers of segments. Intercell, Inc. is one company that produces such chips.

The moon phase display has been shown to substantially cover the entire watch face, but this invention is not limited to such placement of the display as it can be located on any portion and may cover any area of the watch face.

Although this invention has been described in accordance with a preferred embodiment, modifications and improvements thereof may be made without departing from the spirit and scope of the invention as set forth in the appended claims.

I claim:

1. A timepiece for displaying phases of the moon while indicating the time of day comprising:

a time display formed on the face of the timepiece, a plurality of energizable display elements arranged to substantially fill said face of said timepiece, said display elements extending across substantially the entirety of the face of said timepiece, a display controller selectively energizing said display elements to create a light/dark contrast on the face of said timepiece, microprocessor means to control said display controller to change said display of light and dark contrast in synchronism with the phases of the moon, wherein said display elements when energized in combination create a light/dark contrast across substantially the entire face of said timepiece.

2. A timepiece as set forth in claim 1, wherein said plurality of energizable display elements comprise liquid crystal display elements.

3. A timepiece as set forth in claim 1, wherein said face of said timepiece comprises four abutting discrete display sections energizable sequentially to display eight phases of the moon.

4. A timepiece as set forth in claim 1, wherein said face of said timepiece comprises four abutting discrete display sections energizable sequentially to display eight phases of the moon.

5. A timepiece as set forth in claim 2, wherein said face of said timepiece comprises four abutting discrete display sections energizable sequentially to display eight phases of the moon.

6. A timepiece as set forth in claim 1, wherein said face of said timepiece comprises fourteen abutting display sections to display twenty-eight discrete displays synchronized at one a day for the moon phases.

7. A timepiece as set forth in claim 1, wherein said timepiece comprises hands which contrast with the timepiece watch face to display the time of day.

8. A timepiece as set forth in claim 1, wherein said timepiece comprises a watch.

9. A timepiece as set forth in claim 1, wherein said display elements are crescent shaped.

10. A timepiece as set forth in claim 3, wherein said display elements are crescent shaped.

11. A timepiece as set forth in claim 5, wherein said display elements are crescent shaped.

*12. A timepiece apparatus for displaying the time of day and phases of the moon, comprising:*

*a timekeeping mechanism comprising a visual display of the time of the day on the face of the timepiece;*

*an integrated circular moon phase display comprising a plurality of individually energizable visual display elements of appropriate crescent-like shapes which together, when energized, in a predetermined sequence causes them to display conventional sequential phases of the moon, said visual display elements being arranged immediately adjacent to one another to define said integrated circular moon phase display and extending across substantially the entirety of the face of said timepiece;*

*said visual display of the time of day being superimposed on said moon phase display so that said moon phase display is visual background for said visual display of the time of day;*

*a display controller means for selectively energizing said visual display elements of said moon phase display; and*

*microprocessor means to control said display controller means to selectively energize said visual display elements such that said moon phase display is in synchronism with the actual phases of the moon.*

*13. An apparatus as set forth in claim 12, wherein said display elements of said moon phase display comprise liquid crystal display elements.*

*14. An apparatus as set forth in claim 12, wherein said moon phase display comprises at least four visual display elements selectively energizable sequentially to display discrete actual phases of the moon.*

*15. An apparatus as set forth in claim 12 wherein said timepiece comprises a watch of a size to be worn by a person.*

* * * * *